Sept. 21, 1943.  H. J. OLSON  2,330,141
CASKET HANDLE
Filed Nov. 7, 1942    2 Sheets-Sheet 1

INVENTOR:
HENRY J. OLSON,
By John D. Rippey
HIS ATTORNEY.

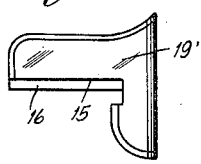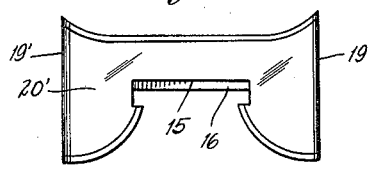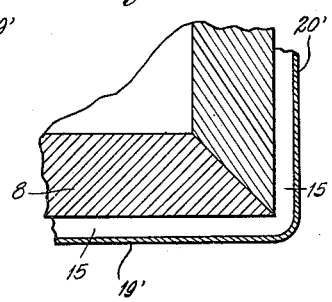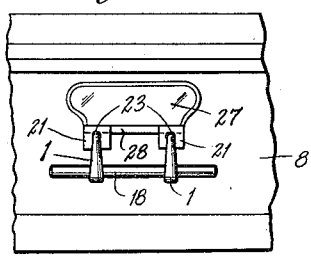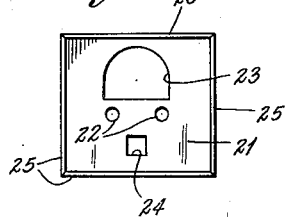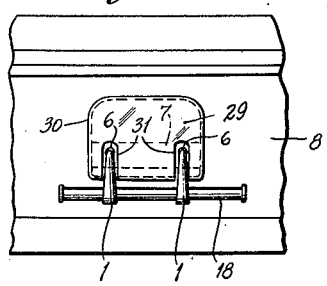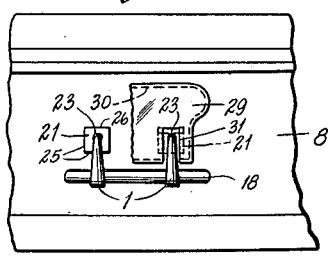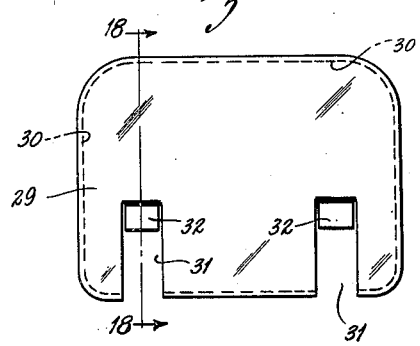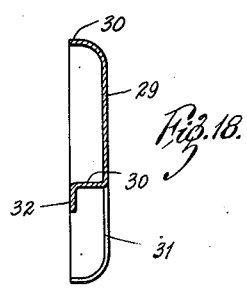

Patented Sept. 21, 1943

2,330,141

UNITED STATES PATENT OFFICE 2,330,141

CASKET HANDLE

Henry J. Olson, St. Louis, Mo.

Application November 7, 1942, Serial No. 464,837

4 Claims. (Cl. 16—112)

This invention relates to casket handles; and has special reference to structure for detachably securing pivoted handles to a casket and for utilizing said structure to attach selected removable and interchangeable escutcheons or plaques to the casket.

An object of the invention is to provide an element for rigid attachment to a casket and adapted to be pivotally engaged by at least one handle arm, and a fastener for releasably securing said element to the wall of the casket and thereby support said arm normally in a pendant position to cover and conceal said fastener, and also in a position to engage, hold and support an ornamenting escutcheon or plaque. The attainment of this object provides a structure in which the fastener is normally concealed by the pendant handle arm and in which the ornamenting escutcheon or plaque may easily be removed and any other preferred or selected ornamenting escutcheon or plaque substituted therefor.

The handle arms, the elements pivotally supporting said arms, and the ornamenting escutcheons or plaques are preferably made of sheet metal appropriately shaped for ornamentation, durability and strength whereby the supporting elements for the handle arms will detachably engage and support the ornamenting escutcheons or plaques for removal, interchange and replacement, as desired.

Another object of the invention is to provide durable, lasting and strong structure whereby the handle arms may be utilized for the purpose of concealing the releasable fasteners, and the elements for supporting the handle arms attain the double function of supporting the handle arms and also supporting the ornamenting escutcheons or plaques for removal, replacement and interchange.

Other objects will appear from the following description, reference being made to the annexed drawings, in which—

Fig. 10 is an outer side elevation or plan or one end portion of a unitary escutcheon or plaque that extends entirely across the end of the casket and along the adjacent portion of the other side thereof.

Fig. 11 is an elevation of that portion of the escutcheon or plaque that extends across the end of the casket.

Fig. 12 is a horizontal sectional view of one corner of the casket and unitary plaque attached thereto.

Fig. 13 is a side elevation of a modified form of the device attached to the side of the casket.

Fig. 14 is an outer side elevation or plan view of an attaching element for engaging a single handle arm and for cooperating with a similar attaching element to engage and hold the ornamenting escutcheon or plaque on the casket.

Fig. 15 shows another form of ornamenting escutcheon or plaque for covering and concealing the element that pivotally supports the handle arm.

Fig. 16 is a view similar to Fig. 15 with a part of the escutcheon or plaque removed to disclose one of the handle arm supporting elements.

Fig. 17 is an enlarged outer plan view of the ornamenting escutcheon or plaque of Fig. 15 apart from the remaining elements of the invention.

Fig. 18 is a cross-sectional view on the line 18—18 of Fig. 17.

Figure 1:
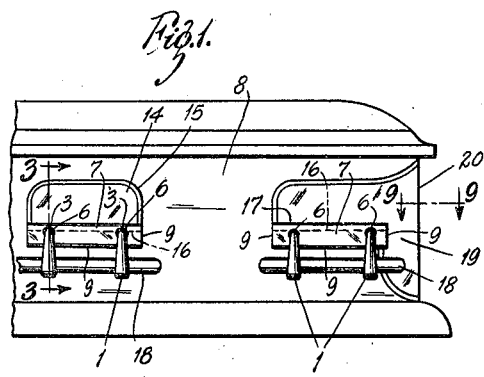
Fig. 1 is a side elevation of a portion of a burial casket having one form of the present invention attached thereto.

Each handle arm 1 is preferably composed of sheet metal bent and formed to provide maximum strength and also to constitute an ornament. Preferably, the sides of each handle arm near one end are formed with fingers 2 separated from the angularly extended end portion 3 of the handle arm by spaces or notches 4. When initially formed, the fingers 2 are separated from the end portion 3 far enough to permit said fingers to be extended through holes 5 while the end portion 3 extends through a hole 6 in the handle arm attaching element 7.

As shown in Figs. 1 to 7, the handle arm attaching element 7 is also composed of sheet metal bent and formed to provide a strong durable and lasting element for attaching the handle arm or arms 1 to the wall 8 of the casket. The attaching element 7 is held spaced from the casket wall 8 by flanges 9 constituting the margins of said element 7 and along three sides thereof abutting against the casket wall 8.

For each handle arm 1, the supporting element 7 therefor is formed with a non-circular hole 10 to receive a complementary non-circular portion 11 of a bolt or other fastener 12. The bolt or fastener 12 passes through the hole 11 and is detachably secured to the casket wall 8, as by a removable nut 13 screwed onto said fastener. The outer end of the fastener 12 is covered and concealed by the handle arm 1. Thus, the handle arm supporting element is rigidly and releasably secured to the casket while the handle arm itself functions to cover and conceal said fastener from view.

The ornamenting escutcheon or plaque 14 is made of sheet metal bent and formed to provide marginal flanges 15 abutting edgewise against the casket wall 8. My invention comprises a downwardly extended flange 16 integral with the lower flange 15 arranged to extend between the casket wall 8 and the flange 17 along the upper margin of the supporting element 7. Thus, the lower flange 15 of the escutcheon or plaque 14 seats upon the flange 17 of the supporting element 7 (Figs. 3, 5 and 6) while the downward extension 16 of the lower flange 15 is clampingly engaged by the flange 17 held rigid by the fastener or fasteners 12.

Figure 3:
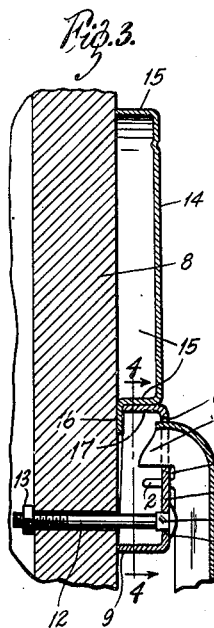
Fig. 3 is an enlarged vertical sectional view on the line 3—3 of Fig. 1.
Figure 5:
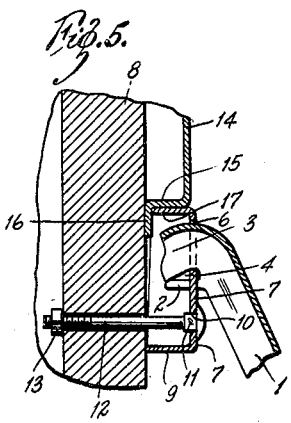
Fig. 5 is a sectional view complementary to the lower portion of Fig. 3, showing the means for holding the handle arm in permanent connection with the attaching element.
Figure 4:
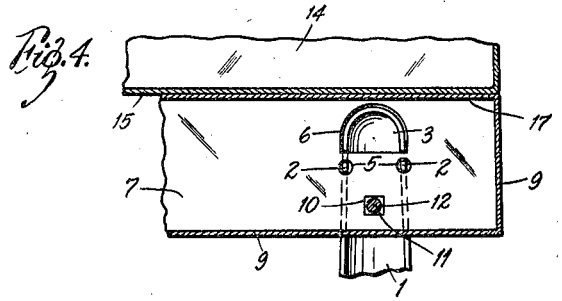
Fig. 4 is a sectional view on the line 4—4 of Fig. 3.
Figure 6:
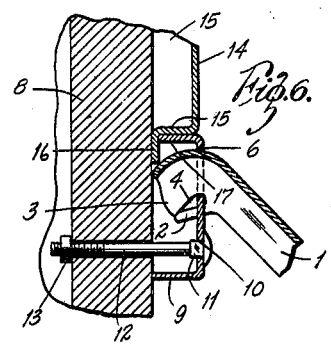
Fig. 6 is a sectional view similar to Fig. 5 showing the handle arm in the final or effective position to which it is moved when the casket is supported by the handles.
Figure 7:
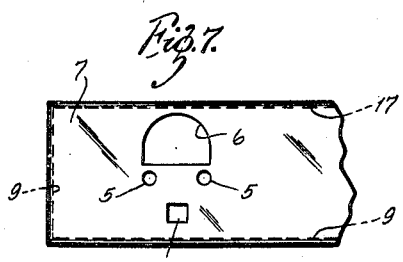
Fig. 7 is an elevation of one end of the handle attaching element unconnected with the handle.

The assembly shown in Fig. 3 permits upward pivotal swinging movement of the handle member 1 through the position shown in Fig. 5 to the final position shown in Fig. 6 in which the fingers 2 are bent against the end 3 of the handle arm to close the openings into the notches or slots 4 and effectively prevent detachment or disengagement of the handle arms from the supporting elements 7. However, this does not prevent the free swinging movements of the handle arms, and leaves the end portions 3 thereof free to be moved to abutting position against the casket wall 8, as shown (Fig. 6), and thereby limit further upward swinging movement of the handle arms. As shown, a handle 18 is attached to the handle arms 1 for engagement by the pallbearers or others bearing the casket. There may be a separate handle for each pair of handle arms 1, thereby usually providing three handles along each side of the casket and one handle at each end of the casket. If preferred, a single elongated handle may be attached to the arms 1 at each side of the casket and extend approximately the full length thereof.

The ornamenting escutcheons or plaques 19 at the ends of the side walls of the casket may extend to engagement with the ends of sheet metal ornamenting escutcheons or plaques 20 extending across the end walls of the casket and held by the supporting elements 7 engaging flanges 16, as already described.

Figure 2:
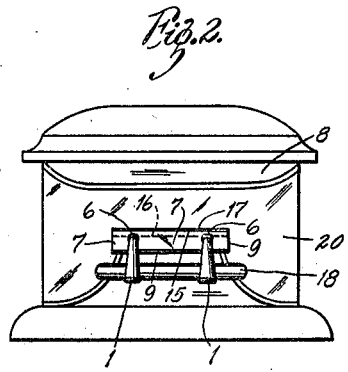
Fig. 2 is an end elevation of the casket showing a unitary ornamenting escutcheon or plaque extending entirely across the end of the casket, held in place by the handle arm supporting element and symmetrically arranged with respect to another ornamenting escutcheon or plaque secured to the side of the casket.
Figure 9:
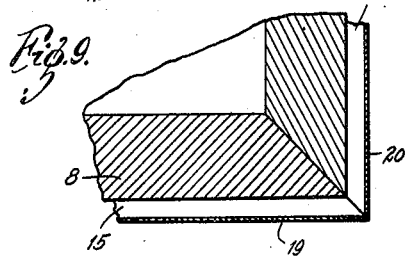
Fig. 9 is an enlarged sectional view on the line 9—9 of Fig. 1.
Figure 8:
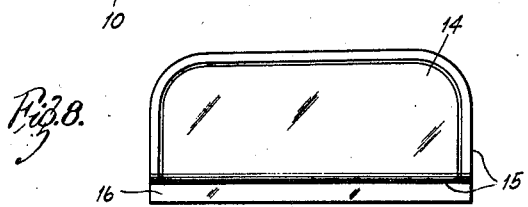
Fig. 8 is an outer side plan view of the ornamenting escutcheon or plaque of Fig. 3 apart from the remaining structure.

Instead of making the ornamenting escutcheons or plaques 19 and 20 separate or unattached to each other, as described and as shown in Figs. 1, 2 and 9, they may be made in a single piece including portions 19', analogous to the separate escutcheons or plaques 19, and portions 20', analogous to the separate escutcheons or plaques 20. These integrally united escutcheons or plaques 19'—20' are engaged and held by the handle arm attaching elements, as already described.

In the embodiment of the invention already described, a single element 7 is provided for supporting each pair of handle arms 1. In said arrangement, the single flange 17 on each supporting member 7 constitutes the entire support and holder for the ornamenting escutcheon or plaque 14. The arrangement described may be varied, and one such variation is shown in Figs. 13 and 14. As shown in said Figs. 13 and 14, each of the handle arms 1 is connected with a separate supporting element 21 having holes 22, 23 and 24 like the holes 5, 6 and 10, respectively, and for the same purposes and functions. The flanges 25 and 26 are substantially like the flanges 9 and 17 and are for the same purposes and functions; which is to say, the flanges 25 abut against the casket wall 8, while the flange 26 supports an ornamenting escutcheon or plaque 27 and clampingly engages a downwardly extended flange 28 thereof. In this arrangement, a separate fastener or attaching bolt like the bolt 12 is provided for each supporting element 21, the non-circular portion 11 of said bolt engaging in the non-circular hole 24 of the supporting element 21 while the head of said bolt or attaching element is covered and concealed by the depending handle arm 1. The supporting elements 21 are wholly exposed and may be ornamented if desired to cooperate with the ornamenting escutcheons or plaques 19', 20' and 27.

The arrangement may be varied so that the supporting elements for the handle arms will support ornamenting escutcheons or plaques 29, and still support the latter for optional removal, interchange and replacement. As in the preceding embodiments already described, this will permit the ornamenting escutcheons or plaques to be removed, interchanged and replaced according to any selection made. In this modified arrangement, each escutcheon or plaque 29 is formed with a marginal flange 30 extending along its lower, upper and end edges and arranged to abut against the casket wall 8. With this type of plaque, either a single elongated handle arm supporting element 7, or separate handle arm supporting elements 21, for each pair of handle supporting arms 1, may be used as desired. In this construction, the lower edge of each escutcheon or plaque 29 is formed with a pair of vertical slots 31 and with an integral downward extension 32 at the upper end of each of said slots. The slots 31 constitute spaces for the handle arms 1 to permit removal, interchange and replacement of selected ornamenting escutcheons or plaques. When the ornamenting escutcheon or plaque is placed in position, the extensions 32 which seat against the casket wall 8 are clampingly engaged by the flange 17 of the handle arm supporting element 7, or by the flanges 26 of separate handle arm supporting elements 21, as desired. In this arrangement, releasable fasteners or attaching bolts 12 are used to secure the handle arm supporting elements to the casket walls 8, and it is only necessary to loosen said fasteners or attaching bolts 12 to permit removal and interchange of any selected ornamenting escutcheons or plaques. The heads of the attaching bolts or fasteners are covered and concealed by the handle arms 1, as in the arrangements already described.

From the foregoing, it should be apparent that this invention attains all of its objects and purposes conveniently, efficiently and economically. The parts are composed principally of shaped or formed sheet metal including the sheet metal handle supporting elements adapted to be pivotally engaged by the handle arms and the fasteners for releasably securing said elements to the walls of the casket to support the arms in pendant positions and conceal said fasteners. The handle arm supporting elements also function for detachable engagement with the ornamenting escutcheons or plaques, and may be loosened to permit removal and interchange or substitution of selected plaques. The different parts are of durable, lasting and strong structure and are made of a minimum amount of material, thus reducing the cost. The device may be varied otherwise than in the specific particulars shown and described without departure from the nature and principle of the invention. I contemplate such variations as may be found expedient or desirable.

I claim:

1. In a casket having walls, a combined handle arm supporting element and clamp composed of sheet metal including a portion for direct pivotal engagement with a handle arm and flanges abutting against one of said walls and holding said portion spaced from said wall, a fastener having direct engagement with said portion of said element and with said casket wall and rigidly supporting said element on said wall, a handle arm having direct pivotal engagement with said element above said fastener and concealing said fastener when said handle arm is pendant, and an ornamenting escutcheon or plaque engaged and clamped between one of said flanges of said supporting element and said wall and thereby held in rigid position and being detachable and replaceable when said fastener is loosened and while said supporting element remains attached to said wall by said fastener.

2. In a device of the character described, a support, an element composed of sheet metal including a body portion and flanges integral with and extending angularly from said body portion abutting against and holding said portion spaced from said support, a fastener having direct engagement with said element and with said support for releasably supporting said element rigidly on said support, a handle arm, means pivotally connecting said handle arm directly with said portion of said element above said fastener for downward swinging movement to a pendant position to cover and conceal said fastener, and a member engaged and clamped between one of said flanges and said support and thereby held in rigid position when said element is held rigid by said fastener and being detachable and replaceable when said fastener is loosened and while said element remains attached to said support by said fastener.

3. In a device of the character described, a support having two adjacent angularly disposed relatively rigid parts, two separate elements each including a body portion and flanges integral with and extending angularly from said body portion abutting against and holding said body portions spaced from said respective parts of said support, fasteners having direct engagement with said respective elements and with said respective parts of said support for releasably supporting said elements rigidly on said support, and an angular member seated against said two angularly disposed parts of said support and clamped between said two elements and said two parts and thereby held in rigid position when said two elements are held rigid by said fasteners and being detachable and replaceable when said fasteners are loosened and while said two elements remain attached to said support by said fasteners.

4. In a device of the character described, a rigid support, an element composed of sheet metal and including a body portion and flanges integral with and extending angularly from said body portion abutting against said support and holding said body portion spaced therefrom, a fastener having direct engagement with said element and with said support for releasably supporting said element on said support, a member seated against said support and clamped between said element and said support and thereby held in rigid position when said element is held rigid by said fastener and being detachable and replaceable when said fastener is loosened and while said element remains attached to said support by said fastener, and a device having direct pivotal engagement with said element above said fastener for downward swinging movement to a pendant position to cover and conceal said fastener.

HENRY J. OLSON.